Jan. 1, 1952 — R. P. PESCARA — 2,580,951
COMBUSTION CHAMBER FOR INTERNAL-COMBUSTION ENGINES
Filed Dec. 19, 1947
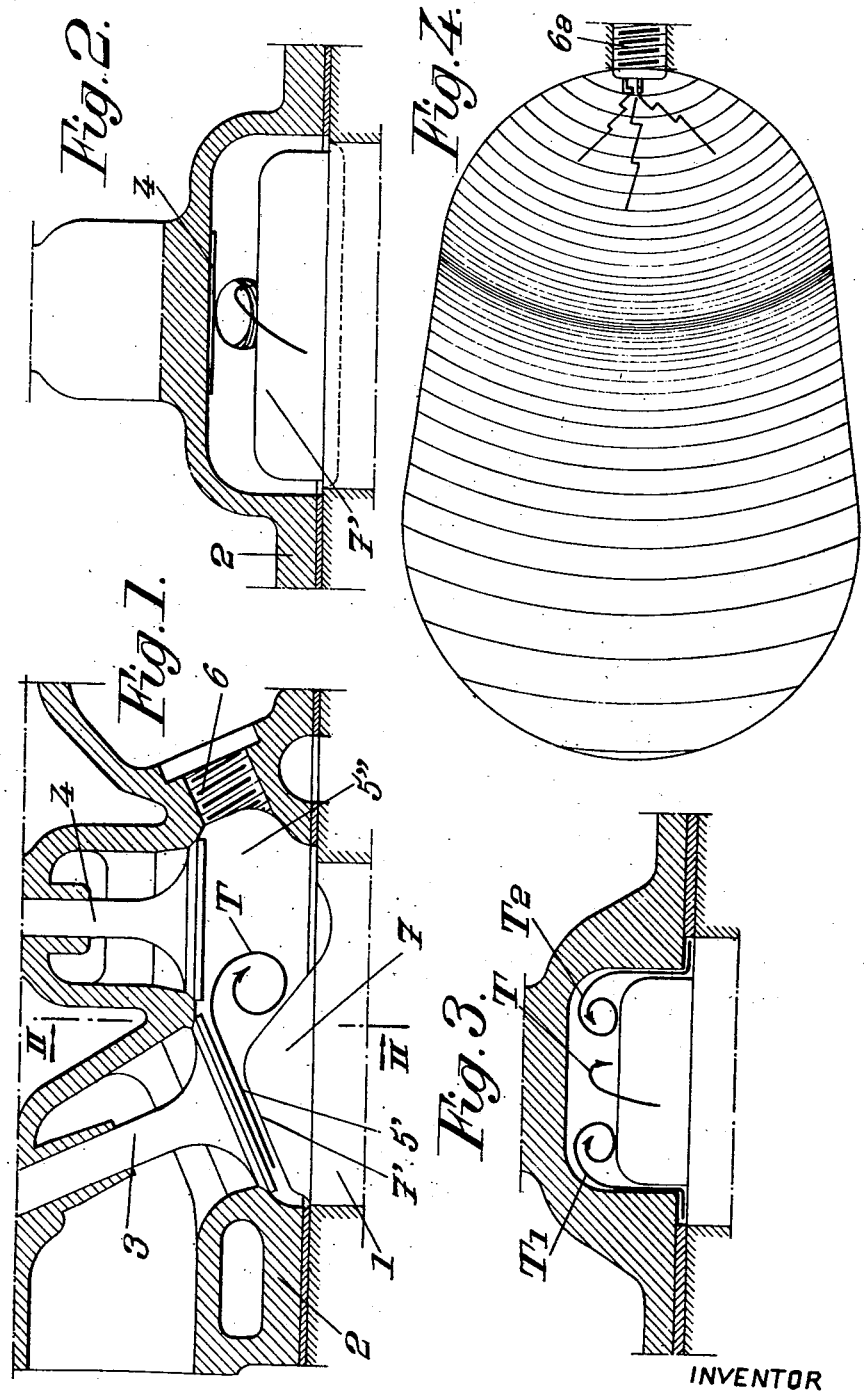
INVENTOR
RAUL PATERAS PESCARA
ATTORNEYS Patented Jan. 1, 1952

2,580,951

UNITED STATES PATENT OFFICE 2,580,951

COMBUSTION CHAMBER FOR INTERNAL-COMBUSTION ENGINES

Raul Pateras Pescara, Cap d'Antibes, France

Application December 19, 1947, Serial No. 792,634
In France September 20, 1947

2 Claims. (Cl. 123—191)

The present invention relates to internal combustion engines and more particularly but not exclusively, gasoline engines.

Its chief object is to provide an engine of this type which is better adapted to meet the requirements of practice than those used up to this time.

Preferred embodiments of my invention will be hereinafter described with reference to the accompanying drawings, given merely by way of example and in which:

Fig. 1 shows, in axial section, the portion of a four stroke engine cylinder head adjacent to the combustion chamber and the upper portion of the piston thereof, said engine being made according to the invention;

Fig. 2 is a section on the line II—II of Fig. 1;

Fig. 3 is a section analogous to that of Fig. 2 of a modification;

Finally, Fig. 4 diagrammatically shows the propagation of combustion in the combustion chamber of an engine made according to my invention.

It is known that the efficiency of an engine is the higher as the rate of compression is higher. However, increases in the rate of compression are limited by the appearance of the phenomenon known under the name of "detonation."

The rate of compression above which this detonation phenomenon appears depends essentially upon the nature of the fuel that is used; for instance, up to now, to avoid detonation, it was not possible, in engines intended to utilize ordinary gasoline, for instance of an octane number equal to 60, to exceed a rate of compression of 6, with cast iron walls for limiting the combustion chamber, the cylinder diameter being, for instance, equal to 70 mm.

In order to utilize higher rates of compression it was necessary, up to the present time, to make use of special gasolines having a high octane number.

The main features of the present invention permits of increasing, for a given fuel, the rate of compression by at least one unit and generally from one and a half to two units, without changing the matter that constitutes the walls of the combustion chamber nor the diameter of the engine cylinder, by giving the end wall of the piston 1 and the cylinder head 2 of the engine cylinder—which cylinder head includes in its upper wall at least one inlet valve 3 and one exhaust valve 4—a shape such that the combustion chamber, limited between the end wall of piston 1 and the inner surface of cylinder head 2, includes two zones one of which, zone 5', located opposite inlet valve 3 the head of which forms an essential portion of the walls of this zone, is of small height, that is to say is flat, whereby in this zone the ratio $$\frac{area}{volume}$$

is high and permits of obtaining a substantial cooling of the gaseous contents of zone 5', whereas the other zone 5'', which is located opposite the exhaust valve or valves 4, is of greater height and volume than the first zone and consequently constitutes a hot zone.

Furthermore, and also according to the main feature of my invention, the spark plug, the seat of which is indicated at 6 in the drawings, is mounted in the hottest portion of the second mentioned zone on the side opposed to the inlet valve; ignition preferably taking place with a considerable lead.

Finally, the ratio of the volumes of the hot zone and the cold zone is advantageously chosen higher than 1, the hot zone generally constituting at least 60% of the total volume of the combustion chamber.

With the above stated constructional arrangements, the fuel being an ordinary gasoline having an octane number of for instance approximately 60, and the walls of the combustion chamber constituted by cast iron, and if ignition takes place with a lead greater than 40° (for instance equal to 44° for a cast iron cylinder head) with a number of revolutions per minute of the engine of about 3000, I can obtain a rate of compression of the fuel mixture of 7.5 and even 8 without detonation taking place. On the contrary, flame propagation is slowed down by the throttled section of the combustion chamber.

Of course, such a combustion chamber can be obtained in many ways.

Figs. 1 and 2 show an advantageous embodiment of such a chamber. The end wall of piston 1 is given an unsymmetrical shape so as to have, opposite the inlet valve 3 housed in an inclined portion of the inner surface of the cylinder head, a projection 7 with an inclined surface 7'' parallel to said inner surface inclined portion, the cold zone 5' of the combustion chamber being thus formed between the surface 7'' of projection 7 of the piston end wall and the inner surface of valve 3.

On the contrary, the piston wall is provided with a recess opposite the exhaust valve 4, the latter being located in a portion of the inner wall of the cylinder head that is perpendicular to the axis of the engine cylinder, the zone between this recess and the exhaust valve being of a great height and its volume being more than one half of the total volume of the combustion chamber.

This second mentioned zone is the hot zone of the combustion chamber since, therein, the ratio $$\frac{area}{volume}$$

60 is much lower than the same ratio in the first zone and the gases are in contact with the exhaust valve.

Due to this arrangement of the combustion chamber, an intensive turbulence (arrow T) is created at the end of the compression stroke, which turbulence brings into the hot zone 5" a portion of the gases cooled in the cold zone 5' so as to contribute in the cooling of the exhaust valve and of the spark plug and to ensure an excellent homogeneity of the fuel mixture.

Furthermore, at the end of the exhaust stroke, most of the residuary gases are expelled through the exhaust zone and improve cooling and volumetric efficiency since heating and expansion of the gaseous mixture are reduced due to the fact that the amount of residuary exhaust gases is much smaller.

It is possible further to improve the turbulence created inside the combustion chamber by giving the cylinder head and the piston end wall a shape analogous to that shown by Fig. 3; according to this modification the cylinder head and the projection of the piston end wall are given, in a plane at right angles to the plane in which are located the axes of the inlet valve 3 and exhaust valve 4, a width smaller than the diameter of the engine cylinder. I thus create, at the end of the inward stroke of the corresponding piston, supplementary turbulences T₁ and T₂ which are added to the above mentioned turbulence T.

Concerning the location of the spark plug at the opposite of the inlet valve and in the hottest portion of zone 5", it ensures a propagation of combustion as diagrammatically shown by Fig. 4, in which the spark plug is designated by 6a, whereas the oval area indicated by this figure represents the interval volume of the combustion chamber seen in plan view and the curves present inside said area represent the different positions of the flame front as it is travelling.

Combustion seems to take place in the following manner:

When the spark is produced, the beginning of combustion is extremely quick, due to the high temperature and perfect homogeneity and gasification of the fuel mixture. But, contrary to what takes place in most of the combustion chambers where propagation of the flame front is uncontrolled and consequently propagation velocities capable of producing detonation are quickly reached, combustion, first highly accelerated when propagating through the hot zone, is gradually slowed down when reaching the cold zone to a relatively low rate (Fig. 4), consequently avoiding detonation. The immediate consequence of flame front propagation control is to eliminate, whatever be the rate of compression, any hardness of operation as generally takes place when the flame propagation velocity reaches values close to detonation velocities.

Besides, the fact that it is necessary to utilize, according to the invention, a very important lead to ignition (for a gasoline having an octane number of 60 and for 3000 revolutions per minute, the best lead in a cast iron cylinder head is equal to about 44 degrees) corroborates the above stated hypothesis of a combustion which is first quick but gradually slowed down.

Of course the invention is applicable to engines having any number of cylinders; in an engine having a plurality of cylinders in line, the axes of the inlet valves 3 and exhaust valves 4 should be disposed in a plane perpendicular to the longitudinal axis of the engine.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In an internal combustion engine, the combination of a cylinder, a piston movable in said cylinder, a cylinder head carried by said cylinder, only one inlet valve and one exhaust valve having their centers disposed at respective points of the upper wall of said cylinder head located in a common axial plane of the cylinder on opposite sides of the longitudinal axis of said cylinder, the portion of said cylinder head inner wall in which is provided the inlet valve being oblique to said longitudinal axis and the portion of said inner wall in which is provided the exhaust valve being at right angles to said axis and adjoining said first mentioned portion and the sum of the diameters of said two valves being nearly equal to the dimension of said inner wall in the plane of said centers, the portion of the piston end face located opposite said intake valve projecting toward said cylinder head and being parallel to the corresponding portion of said cylinder head inner wall at a small distance therefrom, whereas the remainder of said piston end face is concave, so as to form between said cylinder head inner wall and said piston end face a combustion chamber made of two zones, one of which, located opposite said inlet valve, is flat and the other is of relatively substantial thickness, and a spark plug carried by said cylinder head in the second mentioned zone of said combustion chamber in the axial plane of said valves, said engine being operable without detonation at a compression ratio of at least substantially 7.5.

2. A combination according to claim 1 in which the cross section of the inner wall of said cylinder head in the transverse plane along which it is mounted on said cylinder is narrower, in a direction at right angles to the axial plane of the valves, than the cross section of the cylinder in the same transverse plane, said piston projecting beyond said transverse plane into said cylinder head to create a supplementary turbulence.

RAUL PATERAS PESCARA.

REFERENCES CITED

The following references are of record in the file of this patent:

UNITED STATES PATENTS

| Number | Name | Date |
| --- | --- | --- |
| 1,722,404 | Whatmough | July 30, 1929 |
| 1,861,045 | Berry | May 31, 1932 |
| 2,003,571 | Anderson | June 4, 1935 |
| 2,016,734 | Wittenberg et al. | Oct. 8, 1935 |
| 2,203,763 | Zahodiakin | June 11, 1940 |
| 2,214,941 | Taub | Sept. 17, 1940 |
| 2,282,435 | Swaine | May 12, 1942 |

FOREIGN PATENTS

| Number | Country | Date |
| --- | --- | --- |
| 126,449 | Austria | Jan. 25, 1932 |

OTHER REFERENCES

"Automobile Engineer," February 1940, pp. 41-43.